United States Patent
Hausman

(10) Patent No.: US 11,746,747 B1
(45) Date of Patent: Sep. 5, 2023

(54) MULTI-AXIAL VARIABLE HEIGHT WIND TURBINE

(71) Applicant: Matthew Scott Hausman, St. Joseph, MO (US)

(72) Inventor: Matthew Scott Hausman, St. Joseph, MO (US)

( * ) Notice: Subject to any disclaimer, the term of this patent is extended or adjusted under 35 U.S.C. 154(b) by 20 days.

(21) Appl. No.: 17/700,744

(22) Filed: Mar. 22, 2022

(51) Int. Cl.
| | |
|---|---|
| *F03D 7/02* | (2006.01) |
| *F03D 1/06* | (2006.01) |
| *F03D 80/00* | (2016.01) |
| *F03D 13/20* | (2016.01) |

(52) U.S. Cl.
CPC ........... *F03D 7/0204* (2013.01); *F03D 1/065* (2013.01); *F03D 13/20* (2016.05); *F03D 80/00* (2016.05); *F05B 2240/211* (2013.01); *F05B 2240/33* (2013.01); *F05B 2240/9152* (2013.01); *F05B 2270/20* (2013.01)

(58) Field of Classification Search
CPC ........ F03D 1/065; F03D 7/0204; F03D 13/20; F03D 80/00; F05B 2240/211; F05B 2240/33; F05B 2240/912; F05B 2240/915; F05B 2240/9152
See application file for complete search history.

(56) References Cited

U.S. PATENT DOCUMENTS

| | | | | |
|---|---|---|---|---|
| 4,242,043 A | * | 12/1980 | Poulsen | F03D 7/0204 416/11 |
| 7,063,501 B2 | * | 6/2006 | Selsam | F03D 1/025 415/4.3 |

FOREIGN PATENT DOCUMENTS

| | | | | |
|---|---|---|---|---|
| FR | 2964422 A1 | * | 3/2012 | ............... F03D 1/02 |
| WO | WO-2013093124 A1 | * | 6/2013 | ............... F03D 1/00 |

OTHER PUBLICATIONS

Machine translation of FR-2964422, Girerd M., published Mar. 9, 2012 (Year: 2012).*

* cited by examiner

*Primary Examiner* — David E Sosnowski
*Assistant Examiner* — Jason G Davis
(74) *Attorney, Agent, or Firm* — Arthur K. Shaffer; McDowell, Rice, Smith & Buchanan, P.C.

(57) ABSTRACT

The present invention, a multi-axial variable height wind turbine, includes a wind turbine, a structural support, a tilting boom extending between said structural support and said wind turbine, a multiaxial drive mechanism extending upwardly from said structural support for receiving said tilting boom where the multiaxial drive mechanism operationally connects the tilting boom to the structural support for rotation along a plurality of axes. The tilting boom includes a counterweight system positioned opposite said wind turbine which includes a moveable mass which is moved along the tilting boom by a drive mechanism for movement of the wind turbine between a raised position and a lowered position. The wind turbine also includes a plurality of pitched blade members extending between an inner hub and an outer ring.

16 Claims, 11 Drawing Sheets

MULTI-AXIAL VARIABLE HEIGHT WIND TURBINE

FIELD OF THE INVENTION

The present disclosure generally relates to a system and method for capturing wind, in particular to a dynamically adjustable bi-directional wind turbine and method for operating the same.

BACKGROUND OF THE INVENTION

Wind turbines have been around since the 7$^{th}$ century when they were used to grind grain or pump water. Modern horizontal axis wind turbines are used to generate electricity and to supply electricity to the electrical utility grid. It is estimated that there are hundreds of thousands of large wind turbines installed worldwide and collectively they generate over 650 gigawatts of power. Wind turbines are also an important source of renewable energy, and are used throughout the world to provide electricity and reduce reliance carbon emissions. Based on some industry research wind turbines provide the lowest relative greenhouse gas emissions and the least water consumption compared to photovoltaic, hydro, geothermal, coal and gas. Some modern horizontal axis wind turbines are engineered to generate 2-3 MW of electricity and cost approximately $3-$4 million because of their size.

Wind speeds and direction vary based on the rotation of the earth, the local geography, the surrounding objects, the weather, air pressure and the temperature. Ideally, it would best to have a high-speed constant air source which doesn't vary. However, air currents vary. Modern wind turbines are designed to capture wind which is located several hundred feet in the air. As a result of the location of these turbines, it is dangerous, difficult and costly to install, repair and work on typical wind turbines.

Ideally, the wind turbine would be positioned where the most product wind is located. However, as previously indicated, the location of the most productive wind varies as a result of several factors including rotation, weather and time of day. As a result, it would be beneficial to provide a wind turbine which is able to be moved towards the location of the most productive wind.

Maintenance on large wind turbines can be expensive. In some cases, the maintenance includes servicing and repairing the blades, the control system or the gear box. In addition, lighting and the weather can cause damage to the units. The need to transport maintenance personnel and supplies up the mast can be very dangerous and it can take a significant amount of time. Annual maintenance costs for large horizontal wind turbines can be in the tens of thousands of dollars and in some cases, it can exceed $100,000 per year.

In addition, typical wind turbines have three (3) rotor blades which span hundreds of feet in diameter, the blades extending from a central shaft or hub. The large elongated blades begin to turn when wind speeds exceed 3.5 m/s and typically turn between 13 and 20 revolutions per minute. The rotation of the blades is controlled by reduction gear boxes which helps slow the rotation of the massive blades while generating energy. Because these blades are so massive, each blade must help offset the weight of the other surrounding blades and the slightest misalignment or damage to one blade could be catastrophic to the wind turbine. The sound caused by movement of these blades can be loud. In addition, because the rotor blades are so massive along with the reduction gear box and mast necessary to support the massive rotors, the cost for the typical wind turbine is in the millions of dollars. It would be beneficial to have a smaller wind turbine which allows the wind blade section to move to the source of the most efficient wind energy or as otherwise desired.

Some wind turbines are currently designed to rotate in the direction of the oncoming wind using passive or active yaw systems. By rotating into the wind, the current wind turbine design may increase the ability to capture some wind. However, in some cases, the rotation of the wind turbine into the wind assumes that the wind will be horizontal facing. In some cases, the wind currents are not limited to horizontal facing currents, but may include a vertical component as well. This is especially true depending on the surrounding structures, geography or topology. Rotating the wind turbine using a singular axis system may not be as beneficial at capturing these varying wind currents using a multi axial system.

Based in part on the foregoing challenges, there exists a need for multi-axial, variable height wind turbine which is adjustable to convert captured wind energy into electrical energy.

SUMMARY OF THE INVENTION

The need for the present invention is met, to a great extent, by the present invention wherein in one aspect a multi-axial variable height wind turbine is provided that will move between a lowered position and a raised position.

In one embodiment the invention includes a multi-axial variable height wind turbine comprising a wind turbine, a structural support, a tilting boom extending between said structural support and said wind turbine, a multiaxial drive mechanism extending upwardly from said structural support for receiving said tilting boom whereby said multiaxial drive mechanism operationally connects said tilting boom to said structural support for rotation along a plurality of axes, said tilting boom including a counterweight system positioned opposite said wind turbine, said counterweight system including a moveable mass which is moved along the tilting boom by a drive mechanism for movement of the wind turbine between a raised position and a lowered position; and said wind turbine including a plurality of pitched blade members extending between an inner hub and an outer ring.

Generally, the multi-axial, variable height wind turbine includes a tilting boom mounted to a support structure which extends between a wind turbine and a counterweight system which is configured for horizontal and vertical alignment of the wind turbine in response to measured sensory data. The wind turbine further includes a turbine pitch controller configured for selective adjustment of the wind turbine pitch.

Certain embodiments of the invention are outlined above in order that the detailed description thereof may be better understood, and in order that the present contributes to the art may be better appreciated. There are, of course, additional embodiments of the invention that will be described below and which will form the subject matter of any claims appended hereto.

In this respect, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein as well as the abstract are for the purposes of description and should not be regarded as limiting.

As such, those skilled in the relevant art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention. Though some features of the invention may be claimed in dependency, each feature has merit when used independently.

Various objects and advantages of the present invention will become apparent from the following description taken in conjunction with the accompanying drawings wherein are set forth, by way of illustration and example, certain embodiments of this invention. The drawings submitted herewith constitute a part of this specification, include exemplary embodiments of the present invention, and illustrate various objects and features thereof.

BRIEF DESCRIPTION OF THE DRAWINGS

Further features of the present invention will become apparent to those skilled in the art to which the present invention relates from reading the following description with reference to the accompanying drawings, in which a better understanding of the present invention is depicted, in which.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
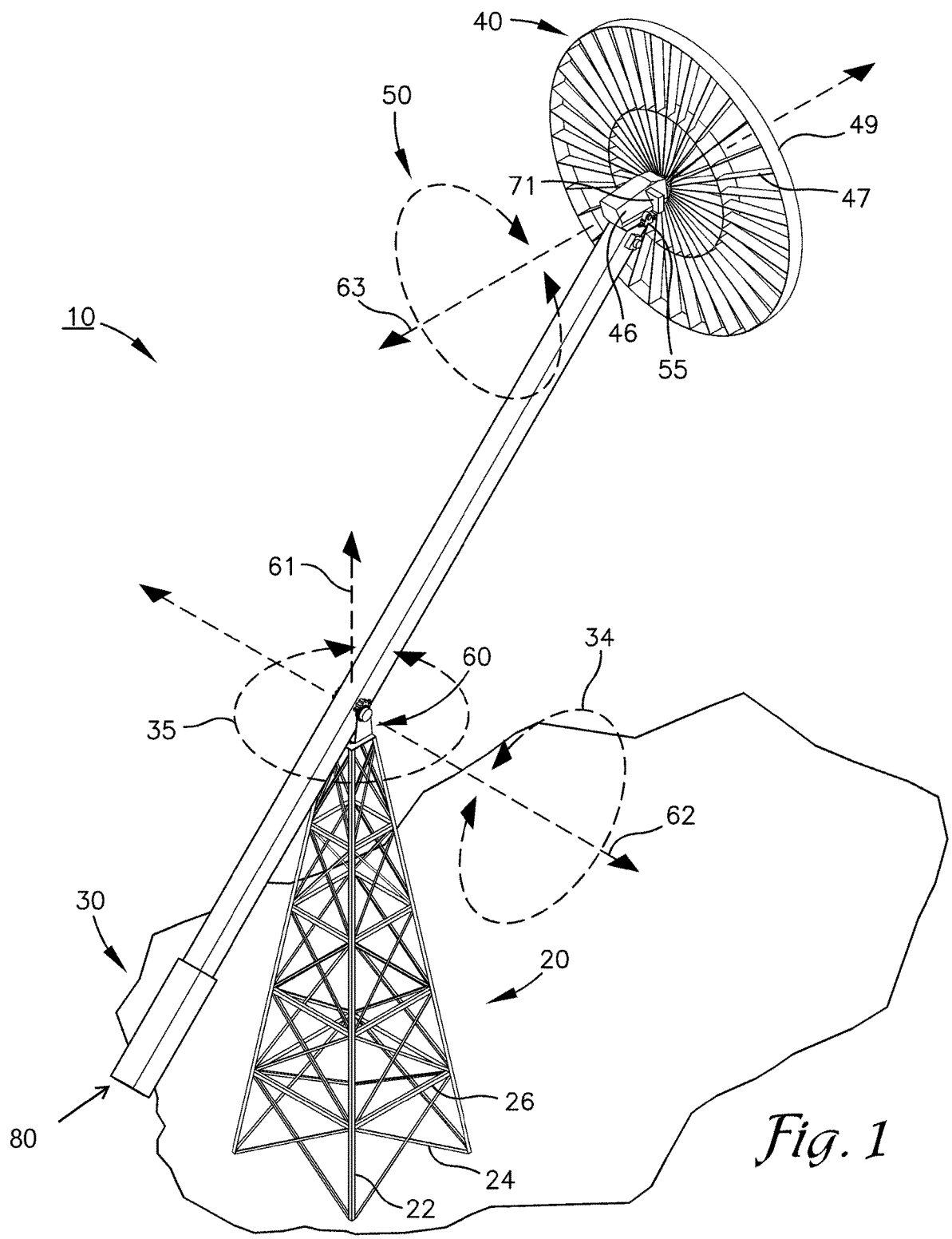
FIG. 1 is a perspective of an exemplary embodiment of the multi-axial, variable height wind turbine in the operational orientation.

Accordingly, the above problems and difficulties are obviated, at least in part, by the present multi axial variable height wind turbine 10 which as depicted in FIG. 1 is supported by a structural support 20 which is operationally connected to and provides the necessary support for supporting the tilting boom 30 during movement of a wind turbine 40 having a plurality of rotary blades 47 extending radially from a central hub 48 to a circumferential support 49. Rotation of a plurality of rotary blades 47 reduces the noise caused by rotation of the wind turbine 40 and provides for a quieter operation.

FIG. 1 further illustrates a nacelle 46 which extends between a distal end of the tilting boom 30 and the wind turbine 40. The nacelle 46 is generally a housing for housing the generator, heat generating devices of various types, such as an inverter, a transformer, along with other mechanical to electrical components which are used to convert the mechanical energy from the rotating wind turbine 40 to electrical energy which can be stored or transmitted using generally known electrical circuitry. The generator is generally attached near a distal end of the tilting boom 30, opposite the counterweight system 80. In addition, the nacelle 46 may optionally include various sensors 72 including a weather and wind sensor or detector which obtains a measurement and transmits data associated with the measurement to a controller 70 in either a wireless or wired manner. In general, the sensor 72 measures and transmits sensor data. The controller may be housed in a control box 71 which can be mounted within the nacelle 46 or another nearby or distant internal or external location as desired.

A turbine pitch controller 55 is illustrated in FIGS. 1, 5, 6, 9 and 10 mounted alongside the nacelle 46. In the illustrated embodiment, the turbine pitch controller 55 is mounted to the distal end 31 of the tilting boom 30 for selective engagement of the nacelle 46. In one exemplary operational embodiment, the turbine pitch controller 55 may be configured for pivoted engagement of the nacelle 46 for selective rotation 50 of the wind turbine 40 towards or away from a longitudinal axis 63. Generally, the longitudinal axis 63, also referred to herein as roll axis, extends centrally through the vertically aligned wind turbine 40. Selective adjustment of the turbine pitch controller 55 adjusts the pitch 52 of the wind turbine 40 from or towards a vertical orientation. Depending on the desired wind currents 51, selective adjustment to the pitch 52 of the wind turbine 40 may help align the wind turbine 40 for greater wind capture efficiency or decrease the wind capture efficiency, as desired. In one operational embodiment, adjustment of the turbine pitch controller 55 in a direction normal to the oncoming wind currents 51a may increase the efficiency of the captured wind currents, which may improve the energy production efficiency of the multi axial variable height wind turbine 10. In one embodiment, the turbine pitch controller 55 may include a programmable, bidirectional, spring return actuator which provides sufficient torque or power to rotate the angular alignment of the wind turbine 40 up to 45 degrees in either direction. In this way, the turbine pitch controller 55 may allow for forward or reversed pitch of the wind turbine 40 in response to measured sensor data corresponding to the direction of the oncoming wind current.

Generally, the tilting boom 30 and wind turbine 40 are smaller in size than a traditional 3-blade HAWT. For example, while the mast on a prior art 3-blade HAWT may be 250 feet tall and 50 feet in diameter, the tilting boom 30 may between 15-100 feet tall with a diameter of between 1 to 10 feet. While the blades on the 3-blade HAWT may be up to 350 feet in diameter, the diameter of the wind turbine 40 can be between 25 feet up to 150 feet. Because of the reduced size and load the base required to support the multiaxial variable height wind turbine 10 is reduced from 50 feet in diameter to less than 30 feet in diameter.

A multiaxial drive mechanism 60 is illustrated in association with the top of the support structure 20. Generally, the multiaxial drive mechanism 60 operationally connects the tilting boom 30 to the supporting structure 20 while providing for rotation of the tilting boom 30 along a plurality of axes. As illustrated in the embodiment depicted in FIG. 1 operation of the multiaxial drive mechanism 60 allows the tilting boom 30 to rotate along the vertical axis 61. The multiaxial drive mechanism 60 generally includes an upwardly extending pair of support members 60a which are configured for receipt of the cylindrical structure 66 which extends outwardly from the tilting boom 30. In the depicted embodiment, the multiaxial drive mechanism 60 also allows for rotation of the tilting boom 30 about the lateral axis 62.

Figure 5:
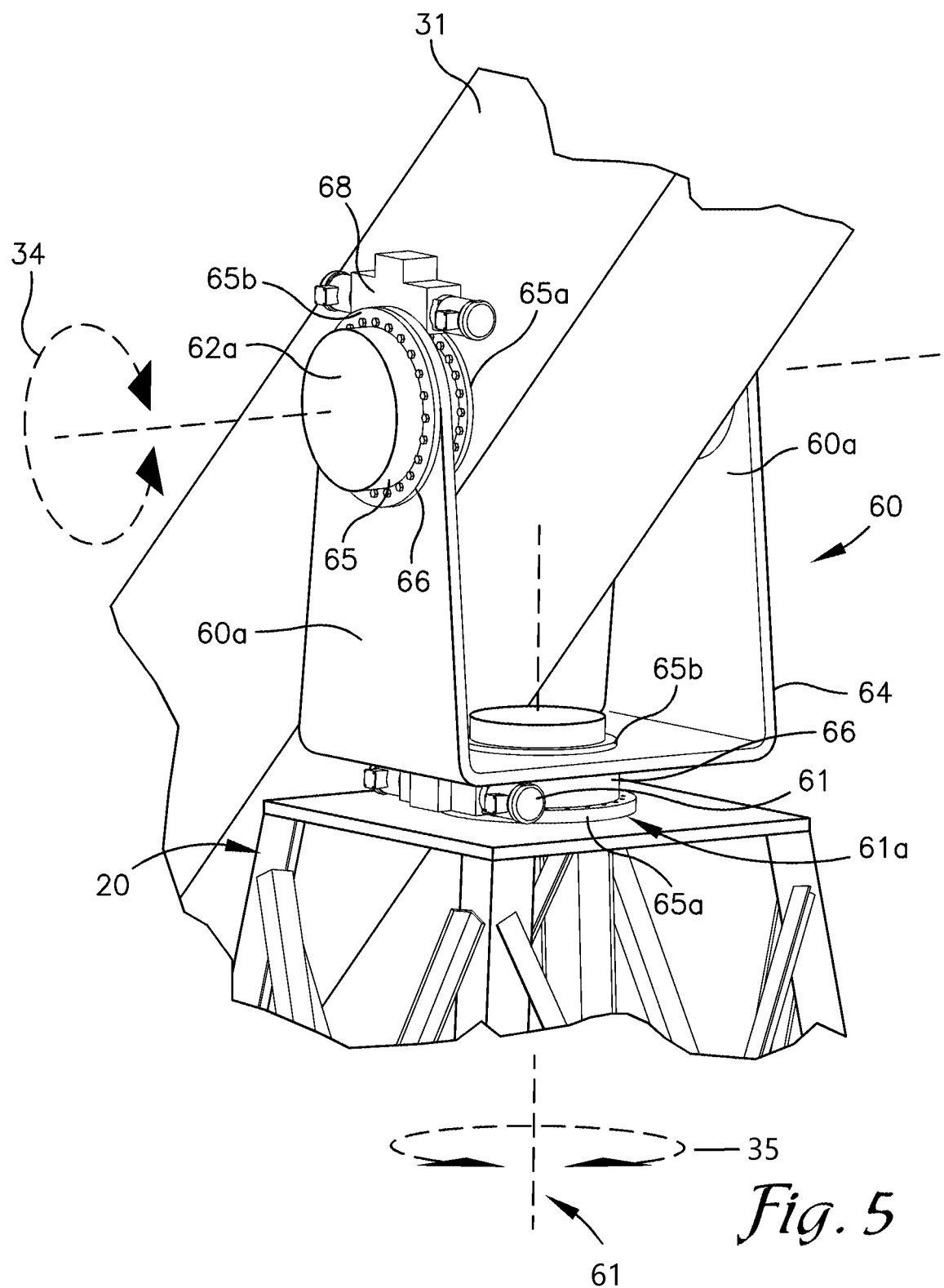
FIG. 5 is a fragmentary view of a multiaxial drive mechanism extending between a support structure and the tilting boom in accordance with the embodiment of the invention depicted in FIG. 1.
Figure 6:
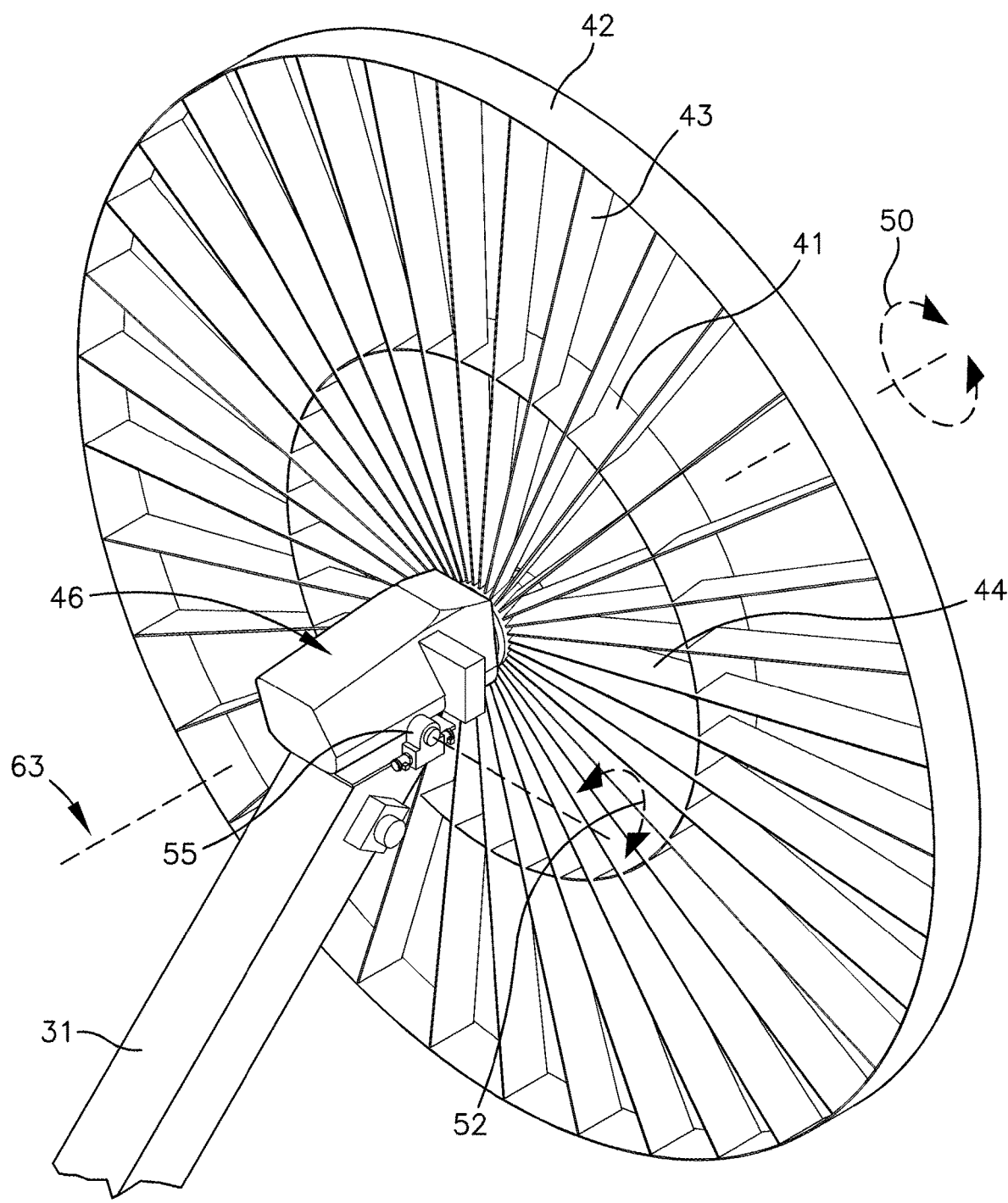
FIG. 6 is a fragmentary rear perspective of an embodiment of a tilting boom supporting a bi-directional wind turbine operably connected to an exemplary horizontal drive mechanism which extends from one side of the illustrated tilting boom in accordance with an embodiment of the invention depicted in FIG. 1.

In the embodiment of the multiaxial drive mechanism 60 illustrated in FIG. 5, an upwardly extending bracket 64 rotationally connects the tilting boom 30 to the supporting structure 20 with a pair of radial drives 61a, 62a. In the depicted embodiment of FIG. 5, a first radial drive 61a and a second radial drive 62a adjust the altitude and azimuth of the wind turbine 40. The first radial drive 61a connects the tilting boom 30 to the support structure 20 for azimuth 35 positioning of the wind turbine 40. Azimuth 35 positioning of the wind turbine 40 is accomplished by rotating the first radial drive 61a in either a clockwise or counterclockwise rotation for rotation of the boom point 30b about the vertical axis 61. Generally, the vertical axis 61 extends centrally through the supporting structure 20. In one embodiment, the tilting boom 30 rotates +/−60 degrees.

The second radial drive 61a rotationally connects the tilting boom 30 to the upending bracket 64 for raising or lowering the altitude of the wind turbine 40. Rotation of the second radial drive 62a, causes rotation 34 of the tilting boom 30 about the lateral axis 62. In general, the lateral axis 62 extends centrally through the upwardly distal tabbed ends of the extending bracket 64. The first radial drive 61a provides for horizontal alignment of the wind turbine 40 as the tilting boom 30 rotates 35 laterally about the vertical axis 61. The second radial drive 62a provides for vertical alignment of the wind turbine 40 as the tilting boom 30 rotates angularly about the lateral axis 62. Together, the first radial drive 61a and the second radial drive 62a provide multiaxial rotation to the tilting boom 30 for alignment of the wind turbine 40 with the desired wind currents.

The depicted embodiment of the first and second radial drive 61a, 62a in FIG. 5 are generally illustrated as slew radial drives but other drive mechanisms could be used such as an electric motor, manual crank motor, gear drive, chain drive, belt drive, rope drive, winch, or winch drive to provide multiaxial rotation of the tilting boom 30. Additionally, the first and second radial drive 61a, 62a may be combined into a single dual-axial drive.

In the depicted embodiment of the first and second radial drives 61a, 62a each includes an upper ring 65b 64 separated from a lower ring 65a by a cylindrical aligning structure 66. In operation, at least one of the upper and lower rings 65b, 65a operates as a slewing bearing and each of the upper and lower rings 65b, 65a is rotatable relative to the other. At least one of the upper and lower rings 65b, 65a generally includes a plurality of engaging structures (not shown) which are configured for engaged receipt by a tangential drive 68 configured for engaging the engaging structures. Rotation of the tangential drive 68 causes rotation of the engaging structures which causes at least one of the upper or lower rings 65b, 65a to rotate in the desired direction.

The tilting boom 30 as depicted in FIG. 1 is an elongated rectangular support which includes at least a partially hollowed interior. In general, the hollowed interior has sufficient dimensions for housing the counterweight system 80 and for movement therein. The tilting boom 30 is generally fabricated from a rigid material having sufficient strength to support the rotating wind turbine 40 and for housing the counterweight system 80 during operation. By way of example, the tilting boom 30 may be fabricated from materials such as steel, aluminum, carbon fiber, etc. Generally, the tilting boom 30 is connected to the multiaxial drive mechanism 60 near the operational center of gravity based on the normal operational characteristics of the rotating wind turbine 40.

The wind turbine 40 is illustrated with a plurality of rotary blades 47 extending radially from a central hub 48 to an outer ring 42. The rotary blades 47 are configured for presenting a blade sweep of sufficient shape to produce the desired power. In one embodiment, each of the rotary blades 47 presents an elongated planar surface with a rectangular surface which is configured for capturing oncoming wind currents. In one embodiment, the rotary blades 47 are mechanically fixed to the central hub 48 with an angular pitch of between 15 to 120 degrees.

Generally, a plurality of radial axes extend outwardly from the central hub 48 to the outer ring 42 along each of the rotary blades 47. In one embodiment, the rotary blades 47 are fixed to the central hub 48 with a neutral orientation while allowing for rotation from +/−15 degrees to +/−120 degrees vertically about the radial axes and horizontally from the wind axis (not shown) which extends parallel to the velocity vector of the surrounding wind currents. Depending on the desired rotation of the wind turbine 40, the angular pitch of the rotary blades 47 may be rotated towards or away from the wind axis. Generally, the wind turbine 40 includes sufficient support for retaining the rotary blades 47 in the desired position during operation of the wind turbine 40. In the depicted embodiment, the wind turbine 40 includes the outer and an inner ring 42, 41 which provide support for maintaining the spacing of the rotary blades 47 as they extend radially from the central hub 48.

The inner ring 41 is generally configured for providing support to the rotary blade 47 during rotation of the wind turbine 40 and is positioned along the rotary blade 47 to provide additional support during rotation. In one embodiment, the inner ring 41 provides sufficient support to maintain the position, spacing and/or pitch of the rotary blades 47 and to prevent deflection of the rotary blades 47 while adding stability to the wind turbine 40 during rotation. In one embodiment, the inner ring 41 provides sufficient structure to prevent undesired vibration to the wind turbine 40 which may be caused, for example, from the captured wind currents. The outer ring 42 is generally configured for supporting the tip of the rotary blades 47 during rotation of the wind turbine 40. Additionally, the outer ring 42 can be configured to funnel additional wind energy to the wind turbine 40.

In one embodiment, the counterweight system 80 is configured to offset the wind turbine 40 which includes the inner ring 41 and outer ring 42, rotary blades 47, central hub 48 and nacelle 46. In one embodiment, the rotary blades 47 extend substantially continuously from the central hub 48 to the outer ring 42. Alternatively, the wind turbine 40 may include an inner rotary blade 44 separate from an outer rotary blade 43 where the inner rotary blade 44 extends from the central hub 48 to the inner ring 41 and the outer rotary blade extends from the inner ring 41 to the outer ring 42. In one embodiment each of the rotary blades 47 may be angularly fixed to the central hub 48 in the desired orientation for capturing oncoming wind currents. In addition, the central hub 48 provides for attachment of the wind turbine 40 to a power generator (not shown) also referred to herein as a generator generally associated with the nacelle 46.

Figure 2:
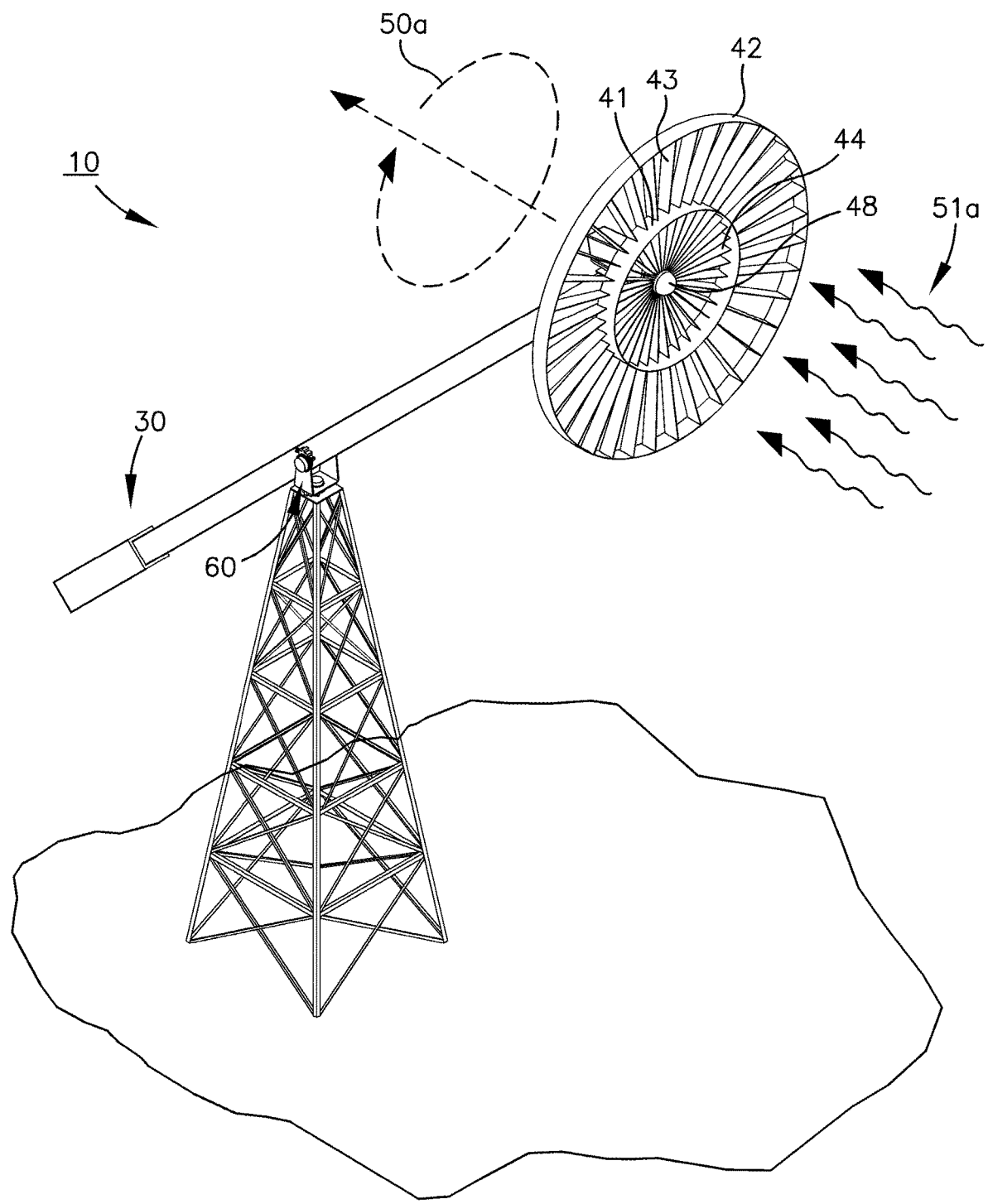
FIG. 2 is a front perspective of the exemplary embodiment of the multi-axial, variable height wind turbine of FIG. 1 rotating in the clockwise direction in response to wind currents coming from the front.

In an alternative embodiment, at least some of the rotary blades 47 may be manually or automatically rotated with, for example, an angular blade controller (not shown). By rotating the rotary blades 47, the wind turbine 40 can increase or decrease the wind capture efficiency as desired for generating the desired energy output. In one embodiment, the angular blade controller (not shown) may be attached to at least one end of the rotary blades 47 allowing for angular rotation of the rotary blades 47. The angular blade controllers may be configured for networked communication to allow for synchronized rotation of each of the rotary blades 47 or they may provide for independent rotation of the rotary blades 47, as desired. In general, the angular blade controller will allow for customization of the wind capture efficiency by changing the angular alignment of the rotary blades 47 top the oncoming wind which will affect the rotation of the wind turbine 40. As depicted in FIG. 2, the wind turbine 40 generally rotates in a clock-wise direction in response to oncoming wind currents.

Figure 3:
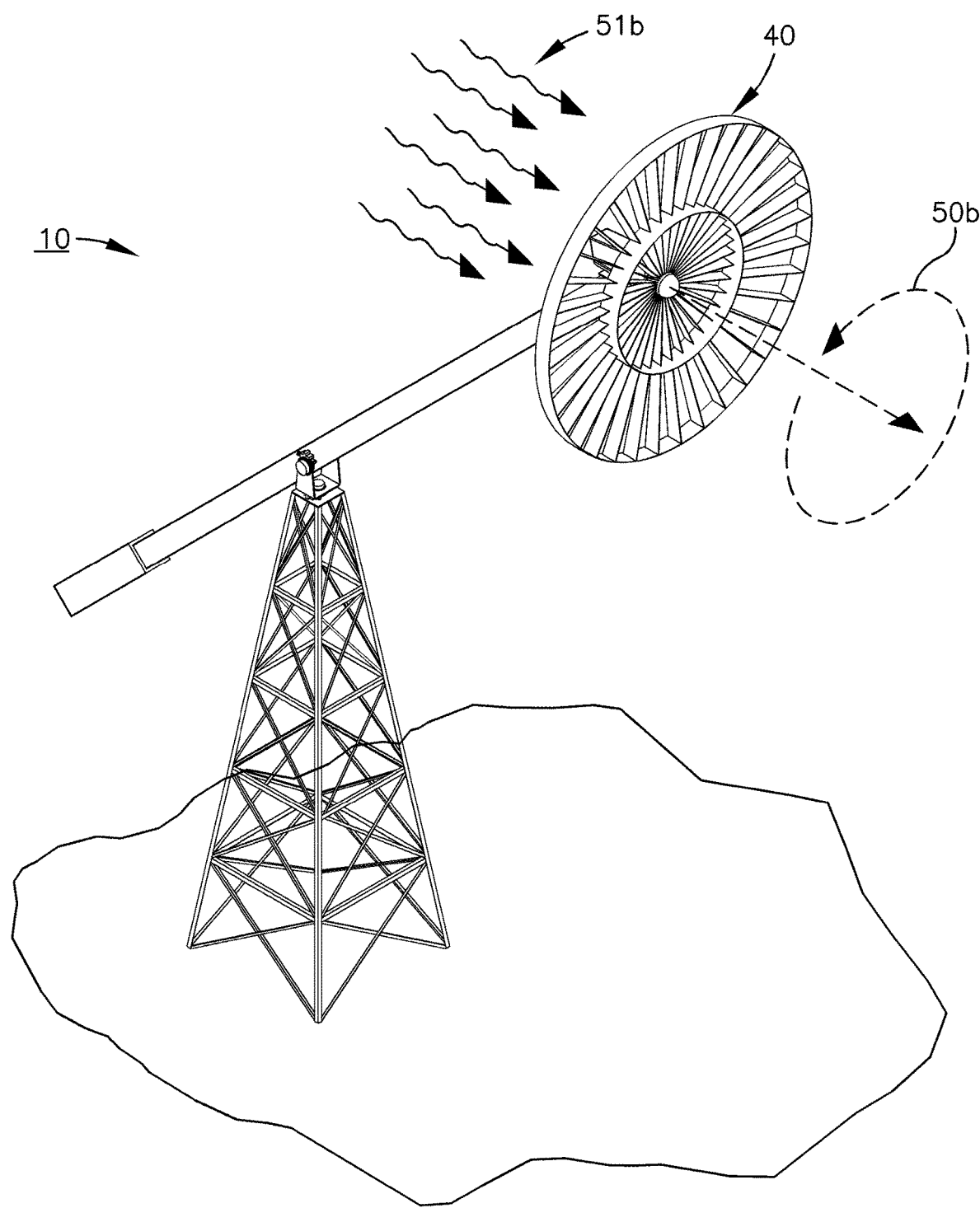
FIG. 3 is a front perspective of the exemplary embodiment of the multi-axial, variable height wind turbine of FIG. 1 rotating in the counterclockwise direction in response to wind currents coming from the rear.

An alternative embodiment is depicted in FIG. 3 and illustrates the wind turbine 40 rotating in a reverse 50*b* or counter-clockwise direction in response to wind currents coming from either the front 51*a* or the rear 51*b*. By allowing for rotation of the rotary blades 47 in both a forward 50*a* or reverse direction 50*b*, the wind turbine 40 can produce energy while rotating in both directions. To facilitate forward direction rotation, the rotary blades 47 can biased or rotated towards the desired orientation for rotation in the desired direction. In one embodiment of the improved wind turbine 40, few mechanical parts are required for operation thus there are fewer mechanical breakdowns and parts which wear-out over time. In addition, by allowing for multi directional operation, the wind turbine 40 can rotate freely. In some situations, it can be operated as a wind vane for a visual depiction of the direction of the oncoming wind currents.

Alternatively, the rotary blades 47 can be positioned in a neutral orientation and the wind turbine 40 can be positioned for rotation by the captured wind currents. The desired rotation can be based on sensor data from sensors 72 and can be based on the desired energy output and the direction of the oncoming wind currents. This can be done programmatically or using various methodologies which are generally know. Generally, the rotary blades 47 can rotate 52 in either direction away from the face of the wind turbine 40 allowing the rotary blades 47 to be rotated towards or away from the oncoming wind current. The rotation 52 of the rotary blades 47 is generally configurable between the entire spectrum of low wind speed applications and high wind speed applications. For example, the wind turbine 40 can be configured for peak power generation upon calculated or programmed alignment of the wind turbine 40 based on the measured oncoming wind currents. Generally, a wind axis extends centrally through the oncoming wind current. The wind currents will present the necessary force for rotating the wind turbine 40. In this way, the rotational speed of the wind turbine 40 and the energy produced by the wind turbine 40 can be monitored and controlled.

Figure 4:
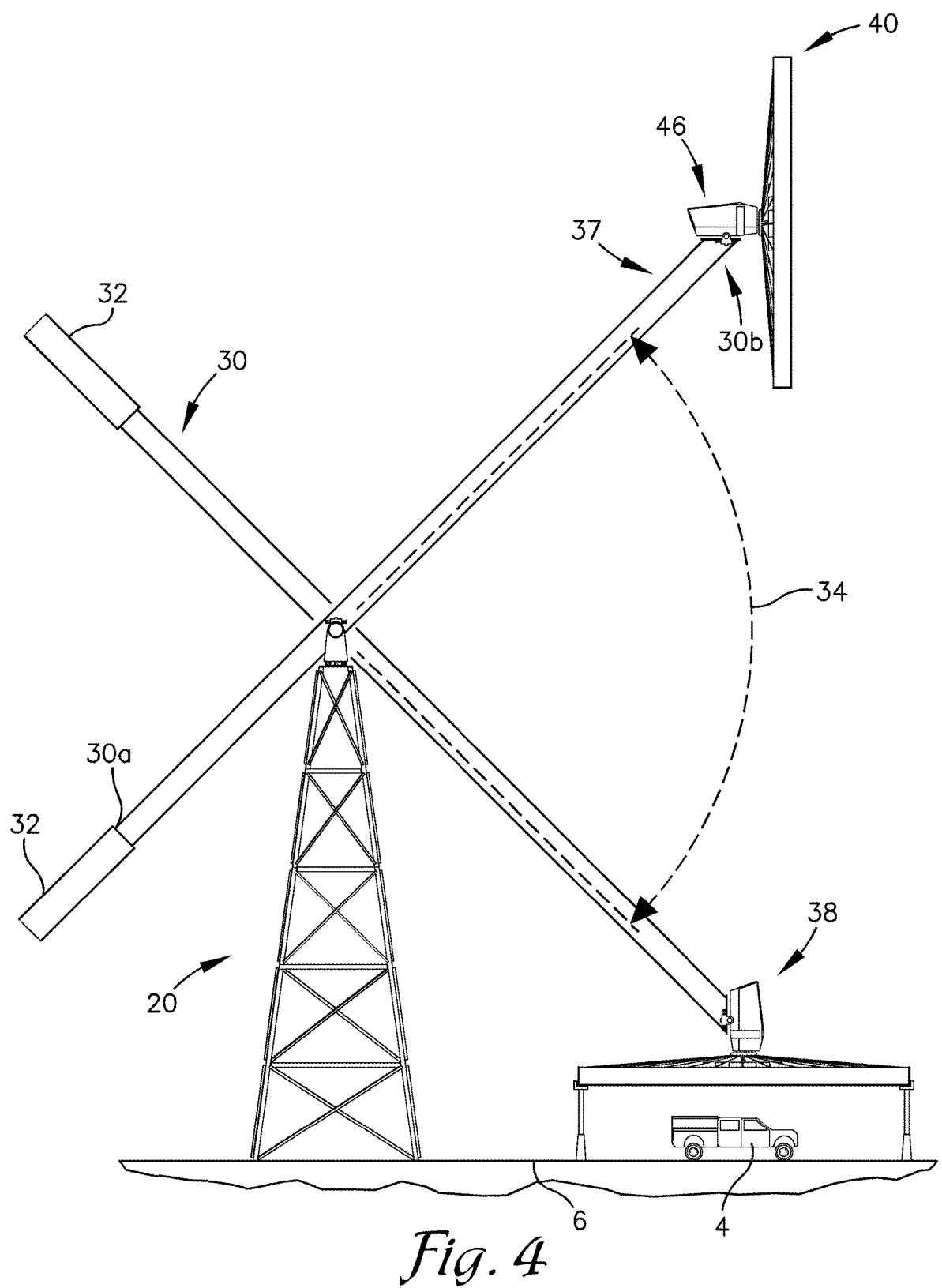
FIG. 4 is a side elevation view of the exemplary embodiment of the multi-axial, variable height wind turbine of FIG. 1 moving from the operational orientation to a serviceable orientation.

FIG. 4 illustrates the multi axial variable height wind turbine 10 in a raised 37 and lowered position 38. In general, the raised position 37 is associated with an operational mode and the lowered position 38 being associated with a maintenance or service mode. For illustration purposes, a representative service vehicle is illustrated below the wind turbine 40 in the lowered, service mode where a service technician can easily access the wind turbine 40 for repairs and service as needed. Alternatively, for complex repairs or maintenance, the wind turbine 40 can be removed from the tilted boom 30 and shipped or transported for repair at a remote location. In the raised, operational mode the wind turbine 30 is raised and directed towards the oncoming wind currents and the tilting boom 30 is raised to the desired vertical orientation where the desired wind energy can be captured by the wind turbine 40 for generating electricity.

In the maintenance or service mode, the wind turbine 40 is positioned in a generally horizontal position facing the ground so that the service personnel can perform work or maintenance at or near the ground 6 a distance from the support structure 20. In addition, if the multi-axial variable height wind turbine 10 is in danger of high winds or other inclement weather it may be commanded to go into a maintenance or service mode with the wind turbine 40 placed into a horizontal position and lowered towards the ground. In addition the wind turbine 40 may be secured into place to avoid any unnecessary rotation. In this way, the wind turbine 40 can be repaired or serviced without having to climb hundreds of feet into the air. Alternatively, the wind turbine 40 may include a braking mechanism (not shown) for limiting or controlling the rotation of the wind turbine 40. In addition, the wind turbine 40 may include a wind diverter for diverting wind away from the wind turbine 40 to protect the wind turbine 40, for example, during high wind conditions.

In one illustrative operational embodiment when the home position is selected, the rotation of the wind turbine 40 is slowed through, for example, a mechanical reduction in rotation by applying a frictional force, like a brake, to the wind turbine 40. After the rotational speed of the wind turbine 40 is sufficiently reduced the pitch of the wind turbine 40 may be rotated towards a vertical orientation. Once the wind turbine 40 is positioned in the desired vertical orientation, the counterweight system 80 is operated for lowering the wind turbine 40. Once the wind turbine 40 is lowered to the desired height, the multiaxial drive mechanism 60 may be operated for rotating the wind turbine 40 to the previously programmed home position.

In one illustrative operational embodiment when the operational position is selected, the counterweight system 80 may be operated to raise the wind turbine 40 to the desired height. Once the wind turbine 40 reaches the desired height, the multiaxial drive mechanism 60 may be operated for moving the tilting boom for alignment in the direction of surrounding wind currents. Once the tilting boom is in alignment with the nearby wind currents, the wind turbine 40 can be positioned for the desired energy production in response to the measured wind data based on the neighboring wind currents as measured by sensors 72 and remote sensors 73 and based on various parameters programmed into the control system.

As illustrated in FIG. 4, the tilting boom 30 has a titling boom angular rotation 34 which extends between the raised 37, operational mode and the lowered 38, service mode. The tilting boom 30 raises and lowers in response to the counterweight system 80 which is housed within the tilting boom 30. In the operational mode the counterweight system 80 is in a retracted orientation. In the service mode the counterweight system 80 is in an extended, forward orientation. Generally, the counterweight system 80 provides a counterweight structure or mass to balance the weight of the wind turbine 40 in the raised, operational mode during operation and the lower, service mode for service of the wind turbine 40.

In general, the counterweight system 80 includes a drive mechanism 81 which provides communication between a linkage member 84 and a moveable mass 82. Generally, the drive mechanism 81 moves a moveable mass 82 along a track 36 extending along the interior of the tilting boom 30. Alternatively, the moveable mass 82 may be a moveable fluid (not shown). In one embodiment, the counterweight system 80 includes additional drive members such as, but not limited to, a gear and/or pulley (not shown) which can help move the moveable mass 82 along the track 36. The moveable mass 82 acts as an offsetting ballast to the wind turbine 40 attached to the distal end 31 of the boom 30. When the moveable mass 82 is moved linearly along the track 36, the center of gravity associated with the tilting boom 30 is shifted forward. As the mass 82 moves forward, the center of gravity of the tilting boom 30 is moved correspondingly along the track 36.

In one optional embodiment, the counterweight system 80 may include a counterweight controller for controlled operation of the drive mechanism 81 for movement of the movable mass 82 along the track 6 for desired operation of the tilting boom 30. The counterweight controller can be configured for local or remote control and may include operation in response to a preprogrammed operation for operation of the tilting boom 30 as desired for movement of the wind turbine 40 to the desired position.

Providing an adaptable multiaxial variable height wind turbine 10 in communication with various sensors 72 allows for more efficient operation, maintenance and protection while maximizing the energy output of the wind turbine 40 based on the programmed parameters and characteristics at lower heights and lower wind speeds.

In addition, or in combination with a counterweight controller, a control system may be utilized for programmed and/or remote controlled operations. For example, the pitch controller 55 may be configured with wired or wireless communication for controlling the pitch of the wind turbine 40. Additionally or alternatively a remote controller may be operationally connected to the first or second radial drive 61a, 62a for controlled or programmed operation of the tilting boom for movement of the wind turbine 40 to the desired position. The remote controller connected to the first or second radial drive 61a, 62a may be configured for forward or reverse rotation in order to position the wind turbine 40 in the desired position. In addition, the remote controller can be operationally connected to a variety of sensors to maximize energy production or to monitor the alignment of the wind turbine 40 as desired for the desired energy output, whether it is maximized, minimized or somewhere in between. The control system may be housed in the control box 71 and may include wired or wireless communication to one or more of the sensors 72 and remote sensors 73.

The proximate end 30a of the tilting boom 30, also referred to herein as a boom foot, is associated with the end of the tilting boom 30 opposite the wind turbine 40. The distal end 30b of the tilting boom 30, also referred to herein as a boom point, is associated with the end of the titling boom 30 near the wind turbine 40.

Generally, the boom foot 30a includes a counterweight housing section 32 for housing the counterweight system 80 components like the drive mechanism 81. The illustrated embodiment of the counterweight housing section 32 is generally rectangular, extending rearwardly from the boom foot 30a, having sufficient dimensions for the drive mechanism 81 and any associated drive components.

In some cases, lowering the vertical position of the supported wind turbine 40 may cause some instability. In an optional embodiment illustrated in FIG. 9, the counterweight housing section 32 can include moveable elements for advancing the counterweight housing section 32 rearwardly from the boom foot 30a or frontwardly towards the boom point 30b. Extension of the counterweight housing section 32 allows the wind turbine 40 to be arranged in a more horizontal orientation with the moment arm, through which the weight of the wind turbine 40 is effectively transferred, providing additional offsetting characteristics for offsetting the supported load for desired vertical placement of the wind turbine 40. In addition, various sensors 72 are illustrated along the support structure 20. Some of the sensors 72 provide horizontal sensor data and vertical sensor data which may be associated with various wind and weather data which may be used to directionally align the wind turbine 40 towards the desired wind currents. A remote sensor 73 is also illustrated which can be mounted a distance from the support structure for providing various ambient related data, like air temperature, wind direction, wind forecast, wind speed data or various ambient and weather related data. In addition, the sensors 72, 73 can include various other sensors to capture various positional, vibration, production, speed, strain gauges, level, visual, audio or other data as desired.

Figure 7:
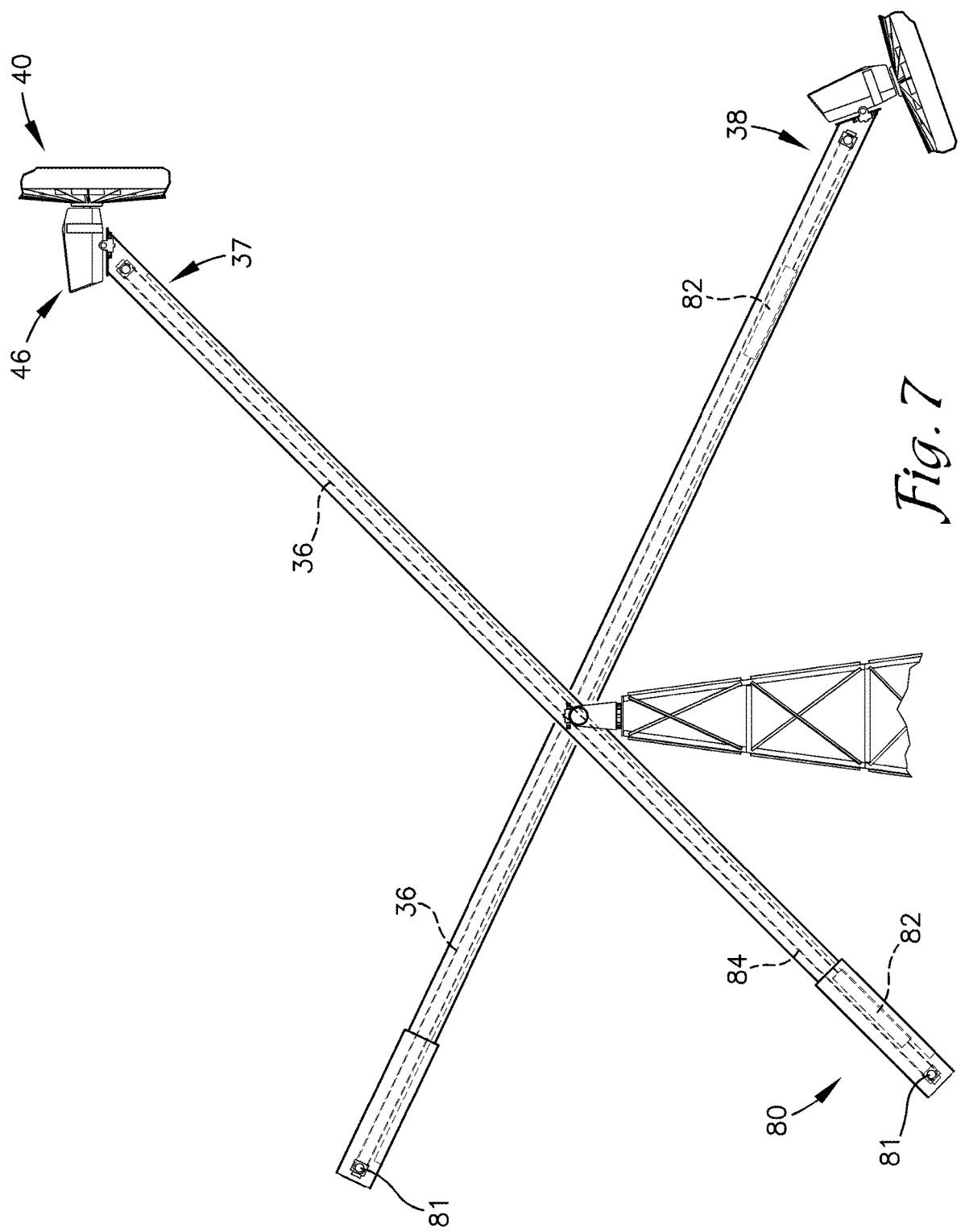
FIG. 7 is a cross-sectional elevation of an embodiment of the tilting boom associated with the multi-axial, variable height wind turbine of FIG. 1 extending between an operational orientation and a serviceable orientation.
Figure 8:
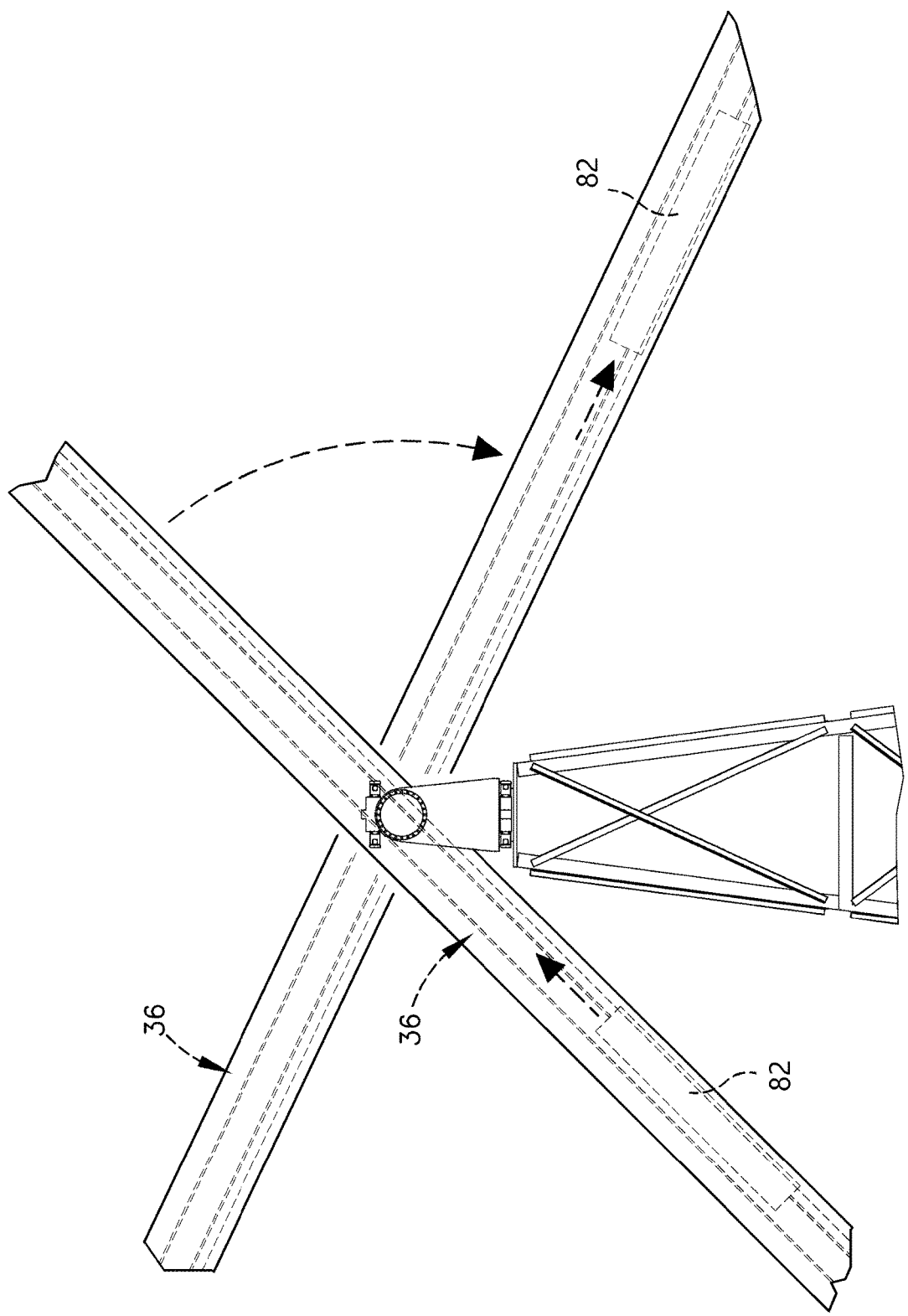
FIG. 8 is a close-up, cross-sectional elevation of an embodiment of a counterweight system associated with the tilting boom in accordance with the embodiment illustrated in FIG. 7 with the tilting boom extending between the operational orientation and a serviceable orientation as the counterweight system moves from a rear to a forward position.
Figure 9:
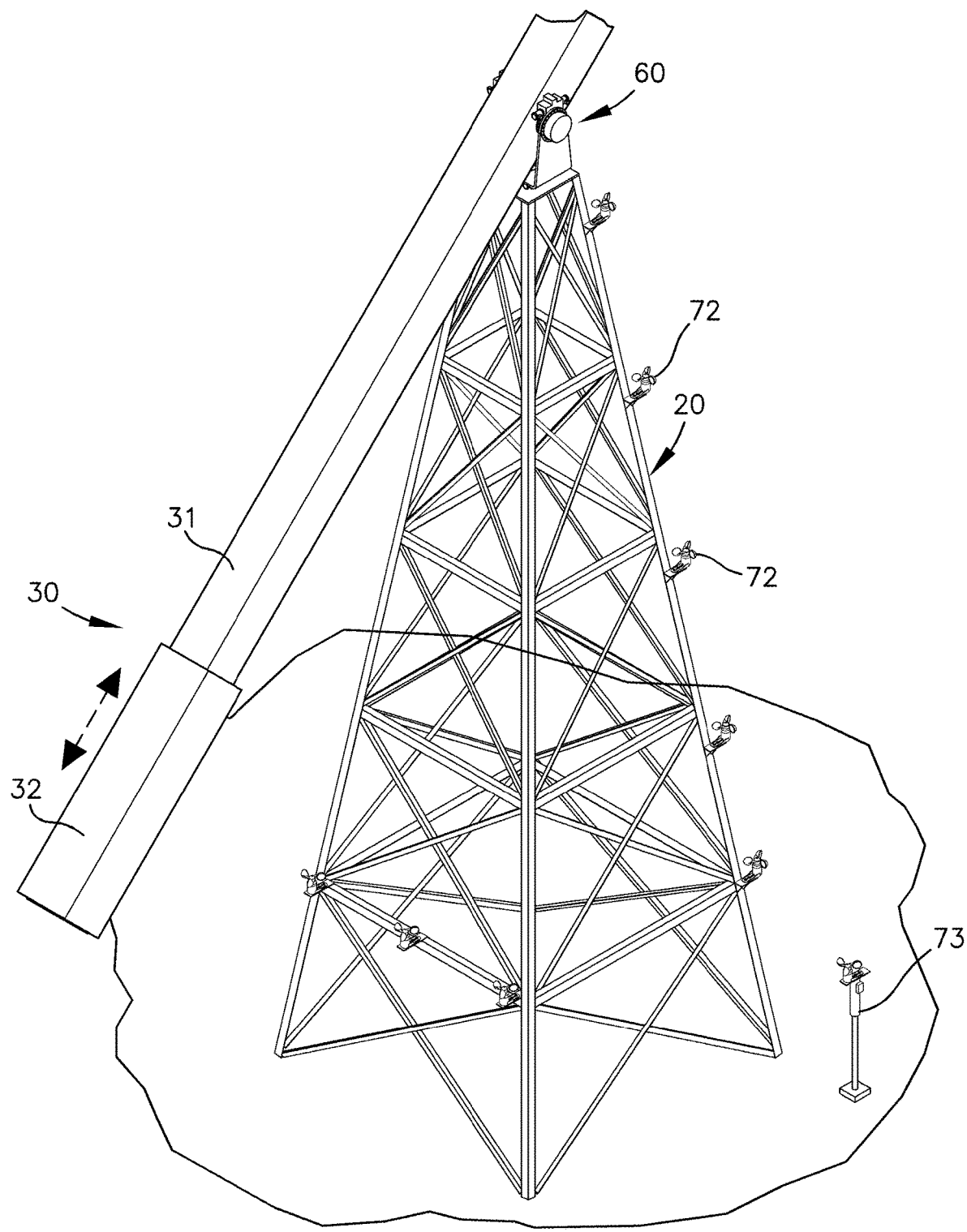
FIG. 9 is a side elevation of the support structure depicted in FIG. 1 with various sensors spaced about the support structure.
Figure 10:
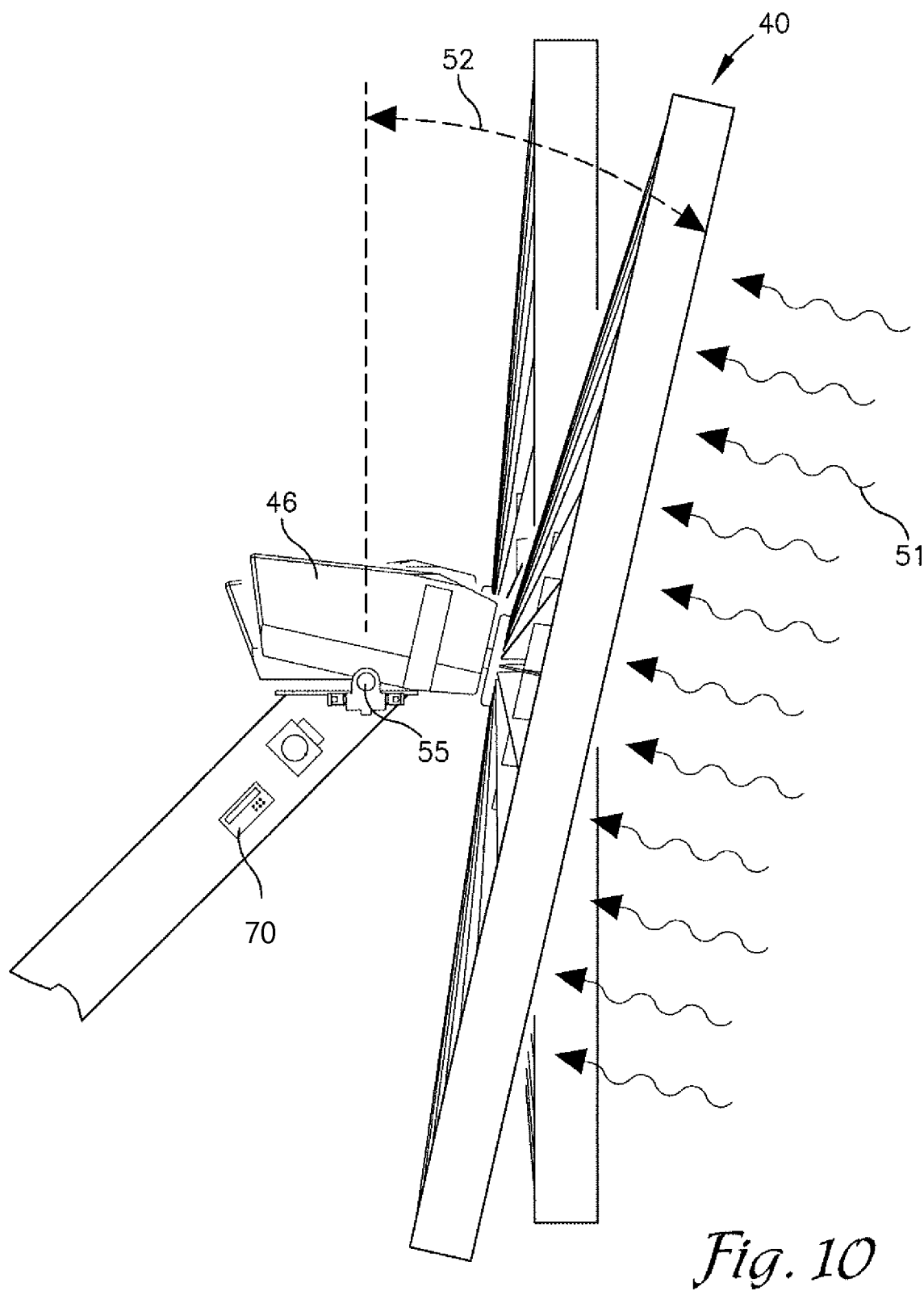
FIG. 10 is a side elevation of the bidirectional wind turbine moving angularly about an axis.

As further illustrated in FIGS. 7-8, the moveable mass 82 is connected to the drive mechanism 81 by the linking member 84, like a chain, cable or track and extends from the boom foot 30a towards the boom point 30b as desired for angular rotation of the tilting boom 30 to position the wind turbine 40 at the desired elevation. The drive mechanism 81 may include a hydraulic or electric motor attached to the boom foot 30a and rotationally coupled to the linking member 84. In one embodiment, the linking member 84 is designed for bidirectional movement, allowing for forward and rearward movement of the moveable mass 82 to readily elevate the wind turbine 40 to the desired elevation. In addition, the drive mechanism 81 may be operationally controlled by an electronic drive controller (not shown) in wired or unwired communication with the controller. In communication with the controller (not shown), the counterweight system 80 can be adjusted based upon a programmed operation or in response to sensor data from at least one remote sensor 72. The drive mechanism 81 may further include a geared rotational mechanism (not shown) which allows for corresponding controlled movement of the linking member 84. In addition, the counterweight system 80 may include a number of limiters (not shown) to limit movement of the moveable mass 82 and angular rotation of the tilting boom 30. In addition, an additional linking member sensor (not shown) may be utilized to allow for monitoring the status of the angular rotation of the tilting boom 30 and allow for manual or programmed angular adjustment, as desired.

Although other support structures may be used, the embodiment of the illustrated support structure 20 includes a lattice-type of structure with longitudinally extending supports which are connected to one another by angularly oriented connection members alternating from angled vertical supports 22 such as the oblique 24 and transverse 26 connection members illustrated in FIG. 1.

Figure 11:
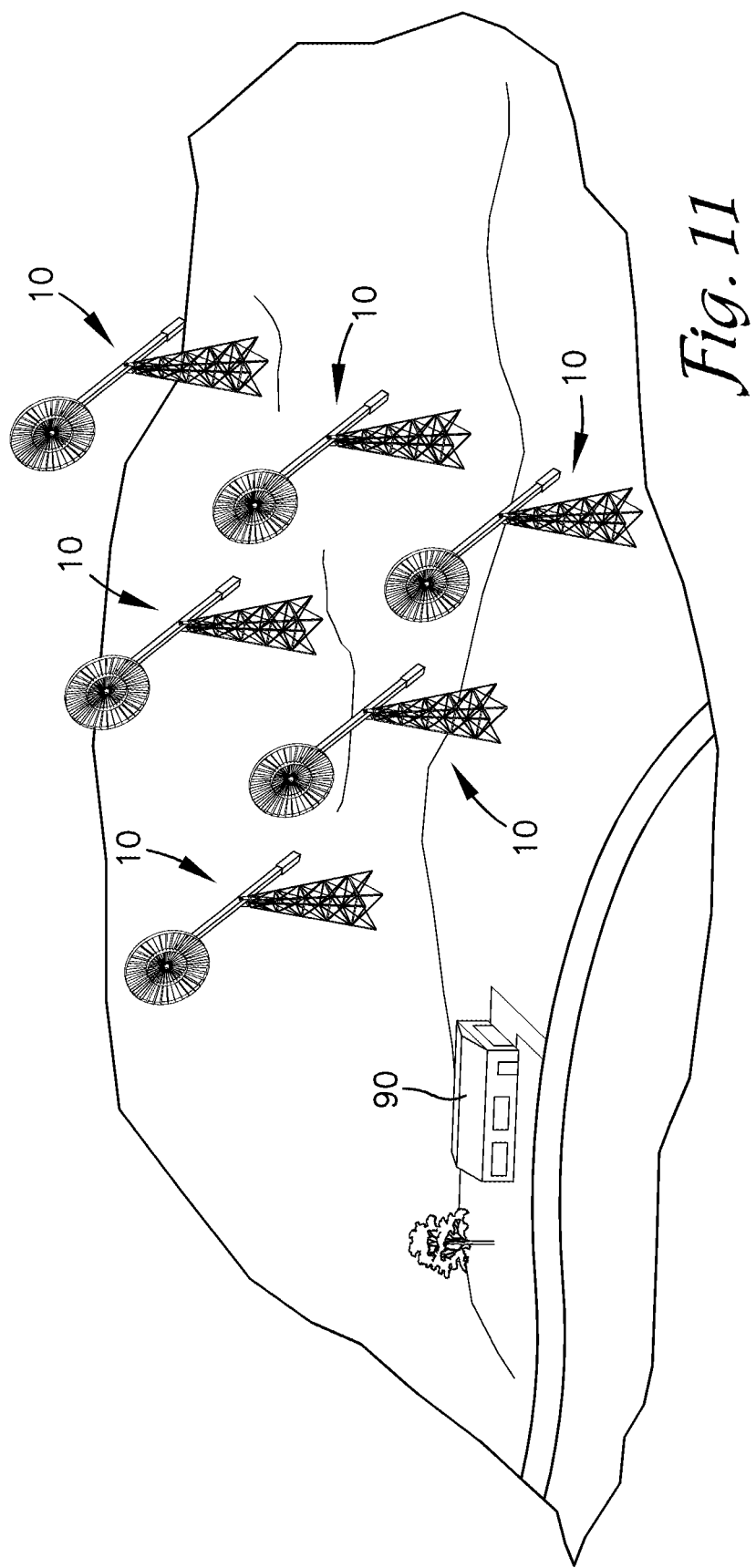
FIG. 11 is a system block diagram of a plurality of multi-axial, wind turbines in networked communication with each other in accordance with another embodiment of the current invention.

FIG. 11 illustrates an alternative embodiment with a plurality of multi-axial variable height wind turbines 10 each being in networked communication with each other for generating energy. In general, each of the wind turbines 10 are electrically connected to a central control system within a computer center 90. As depicted, the wind turbines 10 are in general electrical communication with each other for sharing various operational data and sensory data to generate more efficient energy generation corresponding to various programmed features and characteristics in accordance with various programmed scenarios along with historical data and current sensor data as measured with a plurality of sensors 72 including some remote sensors 73 mounted at strategic locations.

It is to be understood that while certain forms of the present invention have been illustrated and described herein, it is not to be limited to the specific forms or arrangement of parts described herein. Other arrangements or embodiments, changes and modifications not precisely set forth, which can be practiced under the teachings of the present invention are to be understood as being included within the scope of this invention as set forth in the claims below.

What is claimed and desired to be secured by Letters Patent:

1. A multi-axial variable height wind turbine, comprising:
    a wind turbine;
    a structural support;
    a tilting boom extending between said structural support and said wind turbine;
        a multiaxial drive mechanism extending upwardly from said structural support for receiving said tilting boom whereby said multiaxial drive mechanism operationally connects said tilting boom to said structural support for rotation along a plurality of axes;
    said tilting boom including a counterweight system positioned opposite said wind turbine; said counterweight system including a moveable mass which is moved along the tilting boom by a drive mechanism for movement of the wind turbine between a raised position and a lowered position; and
        said wind turbine including a plurality of pitched blade members extending between an inner hub and an outer ring.

2. The multi-axial variable height wind turbine of claim 1 wherein said multiaxial drive mechanism further comprises a first drive and a second drive, said first drive configured for rotation along a first axis of rotation and said second drive configured for rotation along a second axis of rotation.

3. The multi-axial variable height wind turbine of claim 2 wherein at least one of said first and said second drives is a radial drive.

4. The multi-axial variable height wind turbine of claim 2 wherein said first drive rotates said tilting boom about a vertical axis and rotation of said second drive rotates said tilting boom about a lateral axis.

5. The multi-axial variable height wind turbine of claim 2 wherein said first drive rotates said tilting boom about a vertical axis for horizontal alignment of said wind turbine.

6. The multi-axial variable height wind turbine of claim 2 wherein said second drive rotates said tilting boom about a lateral axis for vertical alignment of said wind turbine.

7. The multi-axial variable height wind turbine of claim 2 wherein at least one of said first and second drives is a slew radial drive.

8. The multi-axial variable height wind turbine of claim 1 wherein said multiaxial drive mechanism provides vertical and horizontal alignment of said wind turbine.

9. The multi-axial variable height wind turbine of claim 1 wherein said tilting boom is an elongated rectangular support configured for housing said counterweight system.

10. The multi-axial variable height wind turbine of claim 1 wherein said each of said pitched blade members is configured for rotation about a radial axis extending outwardly from said inner hub.

11. The multi-axial variable height wind turbine of claim 1 wherein said wind turbine rotates in a clockwise and counter-clockwise orientation.

12. The multi-axial variable height wind turbine of claim 1 wherein said multiaxial drive mechanism dynamically aligns said wind turbine in response to sensory data.

13. A method for aligning a multi-axial variable height wind turbine, comprising at least a wind turbine rotor, along at least two of a vertical axis, longitudinal axis and lateral axis, the method including the following steps:
    connecting a multiaxial drive mechanism to a tilting boom with said wind turbine rotor positioned at one end;
    rotation of said tilting boom by said multiaxial drive mechanism;
    configuring said tilting boom for elevation with a counterweight system comprising a moveable mass positioned along said tilting boom; and
    positioning said tilting boom between a raised and lowered position in response to movement of said moveable mass associated with said counterweight system.

14. The method according to claim 13 including aligning said wind turbine rotor horizontally along said vertical axis by said multiaxial drive mechanism.

15. The method according to claim 13 including aligning said wind turbine vertically along said lateral axis by said multiaxial drive mechanism.

16. The method according to claim 13 including pitching said longitudinal axis of said wind turbine rotor.

* * * * *